(12) United States Patent
Saotome et al.

(10) Patent No.: US 11,846,758 B2
(45) Date of Patent: Dec. 19, 2023

(54) IMAGING LENS AND CAMERA DEVICE EQUIPPED WITH IMAGING LENS

(71) Applicant: KYOCERA CORPORATION, Kyoto (JP)

(72) Inventors: Takashi Saotome, Ome (JP); Daisuke Kanai, Ome (JP); Takaharu Fujii, Tokorozawa (JP); Satoru Kihara, Akishima (JP); Kousuke Sugiki, Akishima (JP)

(73) Assignee: KYOCERA Corporation, Kyoto (JP)

( * ) Notice: Subject to any disclaimer, the term of this patent is extended or adjusted under 35 U.S.C. 154(b) by 604 days.

(21) Appl. No.: 17/043,767

(22) PCT Filed: Dec. 28, 2018

(86) PCT No.: PCT/JP2018/048562
§ 371 (c)(1),
(2) Date: Sep. 30, 2020

(87) PCT Pub. No.: WO2019/187459
PCT Pub. Date: Oct. 3, 2019

(65) Prior Publication Data
US 2021/0088756 A1    Mar. 25, 2021

(30) Foreign Application Priority Data

Mar. 30, 2018    (JP) ................... 2018-069205

(51) Int. Cl.
*G02B 13/00*    (2006.01)
*G02B 9/62*    (2006.01)
*G02B 27/00*    (2006.01)

(52) U.S. Cl.
CPC ........... *G02B 13/0045* (2013.01); *G02B 9/62* (2013.01); *G02B 27/0025* (2013.01)

(58) Field of Classification Search
CPC ............ G02B 13/0015; G02B 13/0045; G02B 13/16; G02B 13/18; G02B 15/146;
(Continued)

(56) References Cited

U.S. PATENT DOCUMENTS

2012/0113533 A1    5/2012    Kubota et al.
2014/0293444 A1    10/2014    Abe
(Continued)

FOREIGN PATENT DOCUMENTS

JP    H04186212 A    7/1992
JP    2009157279 A    7/2009
(Continued)

*Primary Examiner* — Travis S Fissel
(74) *Attorney, Agent, or Firm* — VIERING, JENTSCHURA & PARTNER MBB

(57) ABSTRACT

An imaging lens may be a retrofocus type imaging optical system including, in order from an object side, a first lens group, an aperture and a second lens group. The first lens group may include, from the object side, a meniscus as a first lens in which a convex surface is formed on the object side, and a meniscus lens as a second lens in which a convex surface is formed on the object side. The second lens group may include a convex lens as a third lens, a biconvex lens as a fourth lens, a biconvex lens as a fifth lens and a sixth lens, and the fifth lens and the sixth lens may be joined to each other. The imaging lens may be constructed with 6 elements and 5 groups including the first lens group and the second lens group.

16 Claims, 8 Drawing Sheets

(58) Field of Classification Search
CPC ............ G02B 27/0012; G02B 27/0025; G02B 27/0172; G02B 9/62; G02B 9/64; H04N 5/222; H04N 5/2254
USPC ......... 359/756–762, 749, 713, 708, 656–658
See application file for complete search history.

(56) References Cited

U.S. PATENT DOCUMENTS

| | | | |
|---|---|---|---|
| 2016/0170179 A1 | 6/2016 | Jojiki | |
| 2016/0299317 A1* | 10/2016 | Ikegaya | .................. G02B 9/10 |
| 2017/0235121 A1* | 8/2017 | Igarashi | ............. A61B 1/00183 |
| | | | 359/753 |
| 2018/0284577 A1* | 10/2018 | Furutake | ................ G03B 17/12 |

FOREIGN PATENT DOCUMENTS

| | | | |
|---|---|---|---|
| JP | 2012073296 A | | 4/2012 |
| JP | 2012103319 A | | 5/2012 |
| JP | 5042767 B2 | | 10/2012 |
| JP | 2014197131 A | | 10/2014 |
| JP | 2016114648 A | | 6/2016 |
| KR | 20100136832 A | | 12/2010 |

\* cited by examiner

IMAGING LENS AND CAMERA DEVICE EQUIPPED WITH IMAGING LENS

CROSS-REFERENCE TO RELATED APPLICATIONS

This application is a national stage entry according to 35 U.S.C. 371 of PCT Application No. PCT/JP2018/048562 filed on Dec. 28, 2018, which claims priority to Japanese Application No. 2018-069205 filed on Mar. 30, 2018, which are entirely incorporated herein by reference.

TECHNICAL FIELD

The present disclosure relates to an imaging lens and a camera device equipped with the imaging lens.

BACKGROUND

In recent years, surveillance cameras and vehicle cameras have become widespread. As an imaging lens installed in surveillance cameras and vehicle cameras (hereinafter "vehicle cameras"), a wide-angle lens with a fixed focus and a bright F value may be used. In particular, a wide-angle lens with a visual field over 100 degrees may be desired.

In addition, vehicle cameras may be considered for use in cold districts to tropical districts. Therefore, stable performance in the temperature range from low to high is desired for the vehicle cameras.

When designing the wide-angle lens, a lens configuration called a retrofocus may be often used to ensure a sufficient back focus (see Patent Documents 1 and 2). The retrofocus may be constructed with a front lens group and a rear lens group. The front lens group may have a negative power as a whole. The rear lens group may have a positive power as a whole.

Patent Document 1 discusses an imaging optical system which is constituted of 5 elements and 5 groups that may maintain high resolution over a wide temperature range from low to high temperatures.

Patent Document 2 discusses an optical system with 6 elements and 5 groups which may have a front lens group of 3 elements and 3 groups and a rear lens group of 3 elements and 2 groups.

Patent Document 1: Japanese Unexamined Patent Publication No. 2016-114648
Patent Document 2: Japanese Patent Publication No. 5042767

SUMMARY

The imaging lens of the present disclosure may be a retrofocus type imaging optical system that may include, in order from an object side, a front group having a negative refractive power (hereinafter "the first lens group"), an aperture, and a rear group having a positive refractive power (hereinafter "the second lens group). The first lens group may include, from the object side, a meniscus lens (a first lens) having a negative refractive power in which a convex surface is formed on the object side and a meniscus lens (a second lens) having a negative refractive power in which a convex surface is formed on the object side. The second lens group may include, from the object side, a convex lens (a third lens) having a positive refractive power, a biconvex lens (a fourth lens) having a positive refractive power, a biconvex lens (a fifth lens) having a positive refractive power and a sixth lens having a negative refractive power, and the fifth lens and the sixth lens may be joined to each other. The imaging lens may be constructed with 6 elements and 5 groups of the first lens group and the second lens group.

A camera apparatus of the present disclosure may include the imaging lens.

DETAILED DESCRIPTION

Hereinafter, a non-limiting embodiment of the present disclosure will be described in detail with reference to the drawings.

Figure 1:
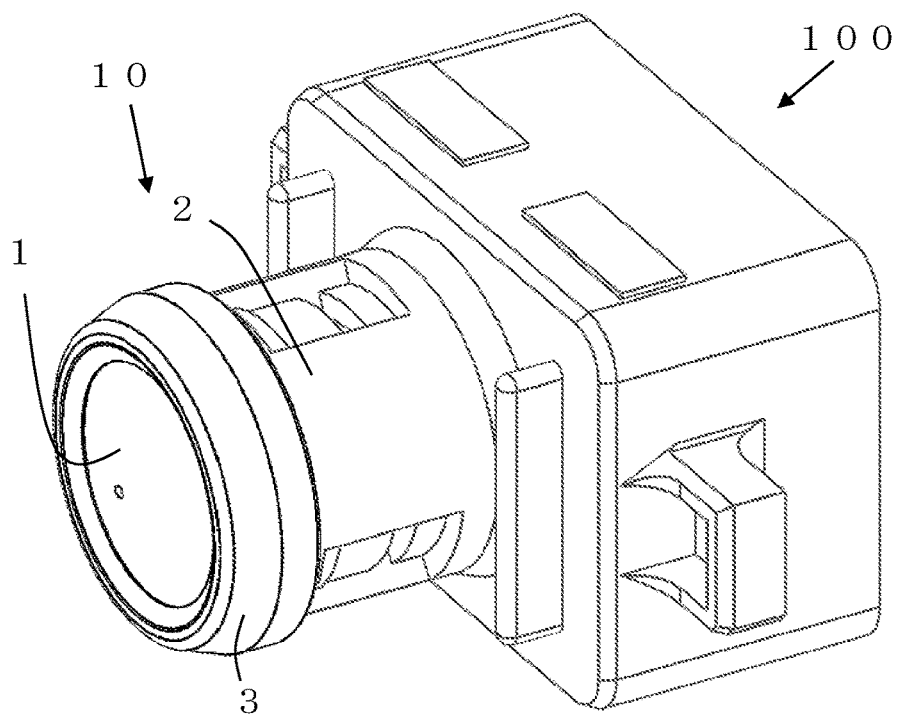
FIG. 1 is a perspective view showing a camera having a lens unit according to a non-limiting embodiment of the present disclosure.

FIG. 1 shows a camera 100 including a lens unit 10 according to a non-limiting embodiment of the present disclosure. The lens unit 10 is constituted with a lens barrel 2 and a lens group 1 having a plurality of lenses which is incorporated in the lens barrel 2. The lens group 1 includes a first lens 11 to a sixth lens 16.

Figure 2:
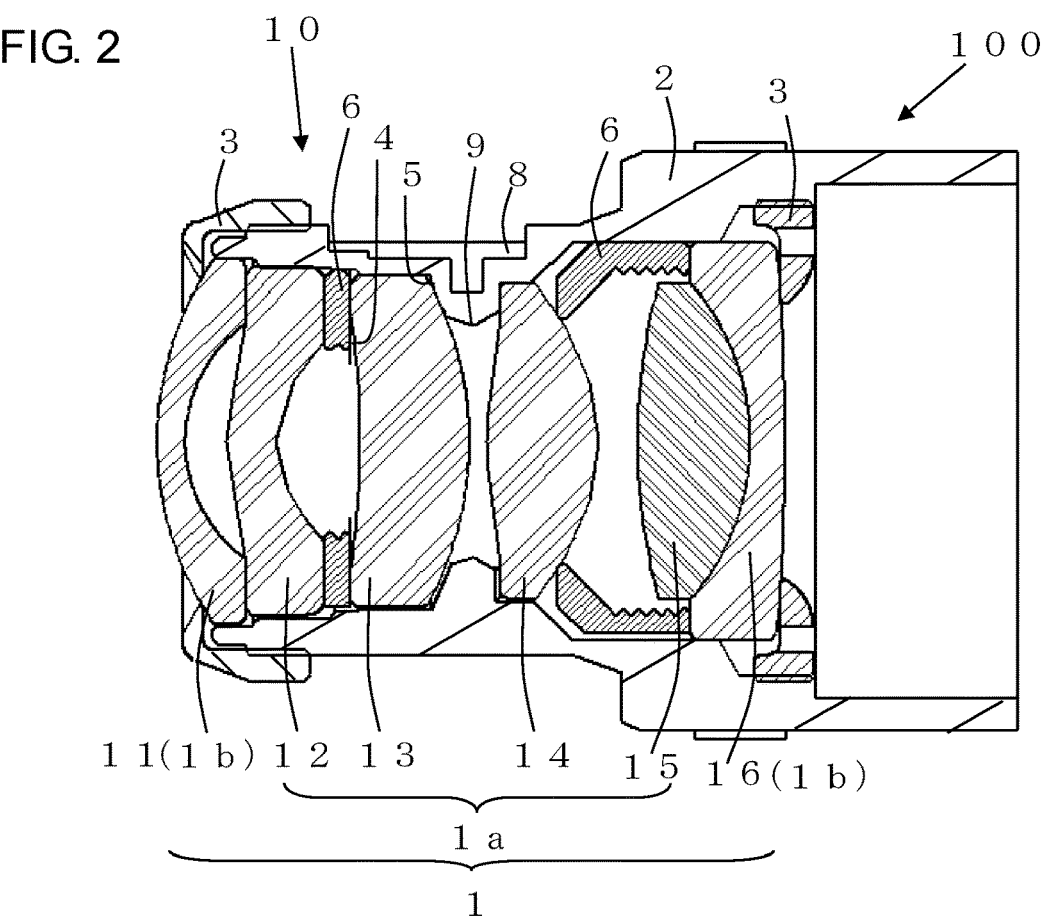
FIG. 2 is a sectional view of the lens unit shown in FIG. 1.

As shown in FIG. 2, the lens group 1 includes an intermediate lens group 1a and both end lens groups 1b. The intermediate lens group 1a includes a second lens 12 to a fifth lens 15. Each of the intermediate lens group 1a is press-fitted and incorporated into the lens barrel 2. The both end lens groups 1b are disposed in both sides of the intermediate lens group 1a in the optical axis direction. The both end lens groups 1b include a first lens 11 on the most subject (object) side and a sixth lens 16 on the most image plane (sensor) side. The both end lens groups 1b are fastened in the lens barrel 2 by a retainer 3.

The material of the lens contained in the lens group 1 is not particularly limited. For instance, glass lenses, thin glass lenses, resin lenses, and the like are used. The lenses included in the lens group 1 are used in appropriate combinations according to the application. The number, diameter, thickness, and the like of lenses included in the lens group 1 may also be different as long as they can be incorporated into the lens barrel 2.

The lens barrel 2 is a cylindrical member made of resin that accommodates the lens group 1 inside. The lens barrel 2 has openings at the ends of both the object side and an image surface side.

The lens barrel 2 may be designed by simulating the minimum necessary press-in pressure (pressure generated on the lens in a direction perpendicular to the optical axis) capable of holding the lenses in the lens barrel within the operating environment temperature range. The press-in pressure is 20 MPa to 70 MPa. It may also be 20 MPa to 60 MPa. By setting the press-in pressure, the adverse effects on the lenses included in the lens group 1 can be suppressed, and glass materials with different linear expansion coefficients can be used. The operating environment temperature range of the lens barrel 2 is −40° C. to 105° C. The temperature may also be from −40° C. to +125° C. This temperature range can be applied to other members including the lens group 1.

The lens barrel 2 is made of resin in terms of easy molding by injection molding (mold-molding) or the like, lightness, and cost. As this type of resin, polycarbonate (PC) resins and polyphenylene sulfide (PPS) resins, for example, may be used. The PPS resin is suitably used because of its high rigidity and strength. In order to achieve higher strength and lower linear expansion, glass fiber, for instance, may be mixed into the resin.

Figure 3:
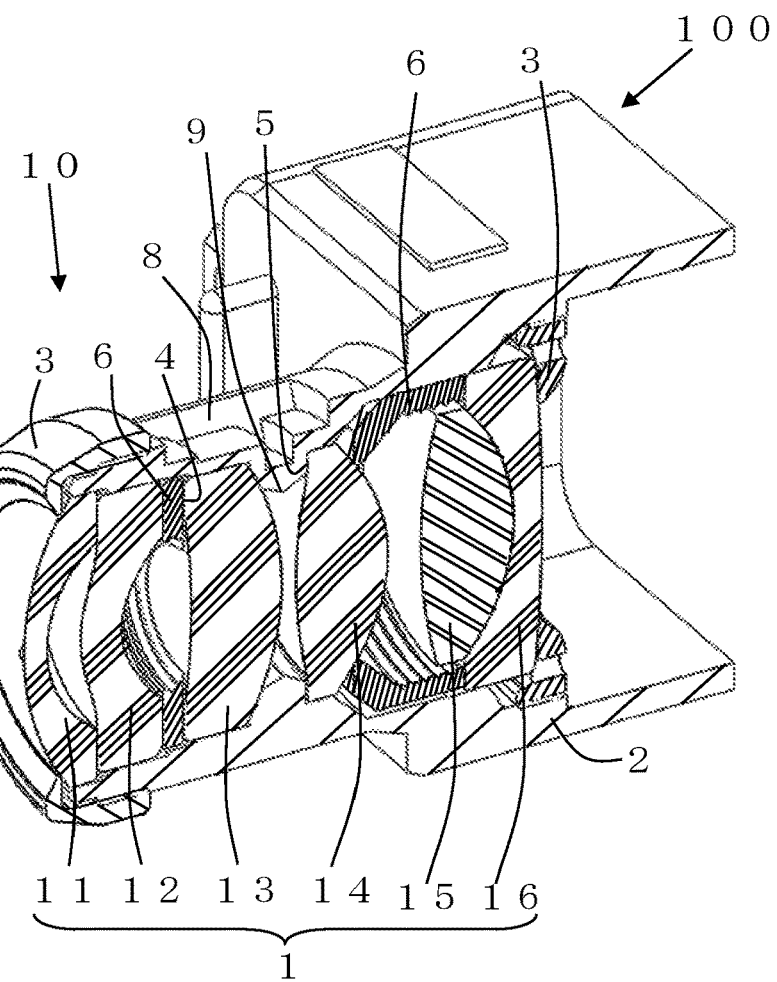
FIG. 3 is a broken perspective view of the lens unit shown in FIG. 1.

As shown in FIGS. 2 and 3, the first lens 11 and the sixth lens 16 are mounted on the end of the lens barrel 2 by a retainer 3. The retainer 3 is an annular member and is attached to the end of the object side and the image surface side of the lens barrel 2 in parallel with the optical axis direction. The retainer 3 then fastens both end lens groups 1b of the first lens 11 and the sixth lens 16 at the end of the lens barrel 2 so as to be respectively clamped in the lens barrel 2. The retainer 3 may not only hold both end lens groups 1b, but may also hold the intermediate lens group 1a in the inner direction of the lens barrel 2. In other words, the second lens 12 with which the first lens 11 is abutted and the fifth lens 15 with which the sixth lens is abutted can be held in the inner direction of the lens barrel 2. The intermediate lens group 1a can hold the entire lens group 1, when adjacent lenses are abutted to an interval ring 6, as described later.

The method of fastening the retainer 3 to the lens barrel 2 is not particularly limited if there is no rattling of the lens to be fastened. For example, screw threads can be cut to an inner circumferential surface of the retainer 3 and an outer circumferential surface of both ends of the lens barrel 2 respectively, and both are screwed. As another example, after fitting the retainer 3 to the lens barrel 2, it may be screwed from the outside with screws (not shown).

The retainer 3 may be formed of an elastic body. This is because the elastic body absorbs linear expansion of the lens unit 10 accompanying the environmental temperature change and provides a stable pressing force in the optical axis direction. The stress due to the elastic deformation of the retainer 3 presses both end lens groups 1b into the lens barrel 2 so that it can be more securely fixed. As the elastic body, for example, a metal material such as aluminum and a resin material such as PPS may be employed. The retainer 3 may be provided with a pressing part or the like which presses the lenses contained in the both end lens groups 1b from the opening to inside respectively. The pressing part is composed, for example, of a plate spring.

Figure 4:
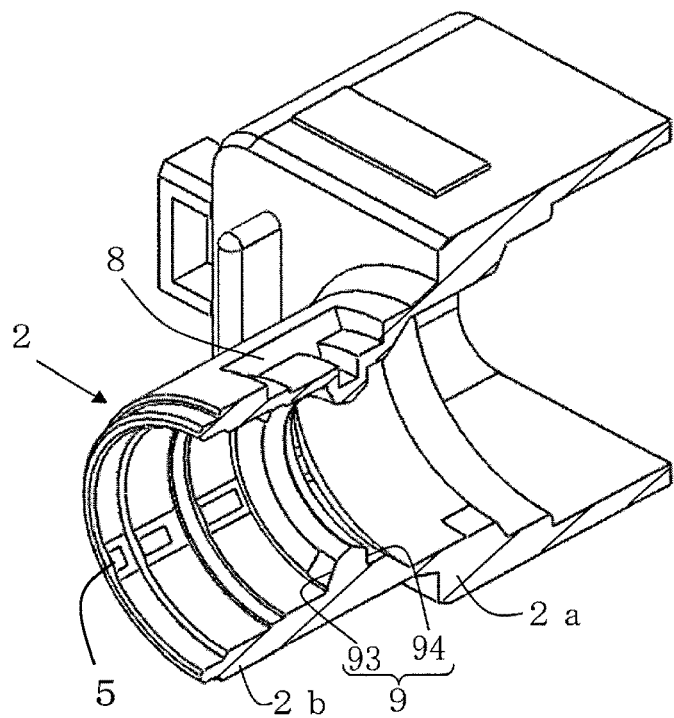
FIG. 4 is a perspective sectional view of a lens barrel of the lens unit shown in FIG. 1.

As shown in FIG. 4, in the inner surface of the lens barrel 2, the inner circumferential surface where the press-fitted intermediate lens group 1a is incorporated is provided with a projection 5 to receive lenses that are press-fitted. This inner circumferential surface may be formed in a substantially circumferential surface shape (polygonal shape). The projection 5 protrudes in chord shape (D-shape, Arc shape) into the lens barrel 2 in order to retain the outer diameter of the lens contained in the press-fitted lens group 1. The height of protruding direction of the projection 5 may be 0.115 mm to 0.105 mm. The thickness of the projection 5 may be greater than the lens edge. The contact area between the projection 5 and the lens may be larger. The larger the contact area, the lower the stress and the more secure the lens retention. On the contrary, if the contact area is small, the stress increases and the projection may be plastically deformed, resulting in the rattling of the lens.

The projection 5 is not necessary to be provided over the entire circumference in the inner surface of the lens barrel 2. There may be at least one projection 5 to retain the outer diameter of the lens contained in the lens group 1. The projection 5 may be provided with predetermined intervals in the inner circumferential direction. The projection 5 may be provided at three or four points with predetermined intervals, for example, so as to divide the inner circumference of the lens barrel 2 into three or four equal parts. By providing the projection 5 with predetermined intervals, even when the outer circumferential surface of the lens contained in the lens group 1 abuts against the projection 5, the intervals between the projections 5 create a gap to let air through between the outer circumferential surface of the lens contained in the lens group 1 and the inner circumferential surface of the lens barrel 2. As a result, the lenses contained in adjacent lens group 1 are not hermetically sealed from each other, and the pressure can be released. Therefore, the shape of the lens barrel 2 can be restrained from being further deformed.

The projection 5 may be provided for each lens of the press-fitted intermediate lens group 1a, and the shape and location may vary depending on the diameter of each lens. The projection 5 may be integrally molded with the lens barrel 2 by resin molding or the like. The projection 5 may be formed by attaching a separate member to the lens barrel 2.

As shown in FIG. 4, the lens barrel 2 has a thick wall part 2a and a thin wall part 2b. The thick wall part 2a and the thin wall part 2b have different thickness, with the outer circumferential surface where the intermediate lens group 1a is press-fitted in response to the outer diameter of the lens. The thin wall part 2b has a concave portion 8. The concave portion 8 is formed on the outer circumferential surface of the region including the part where the projection 5 is formed on the inner circumferential surface of the lens barrel 2. The concave portion 8 can be provided by cutting, for example, the outer circumferential surface of the lens barrel 2 in the region including the part where the projection 5 is formed. This concave portion 8 may be corresponded to the location and number of positions of the projection 5 in the lens barrel 2.

Conventionally, when the intermediate lens group 1a is press-fitted into the lens barrel 2, a high stress is generated by the difference between the inner diameter of the inner diameter of the lens barrel 2 and the outer diameter of the lens contained in the press-fitted lens group 1 due to a large rigidity of the lens barrel 2. However, the rigidity of the lens barrel 2 at a lens housing location can be relaxed to reduce the press-fit pressure of the lenses included in the lens group 1, by providing a concave portion 8. This makes it possible to press-fit lenses such as resin lenses and thin glass lenses, which have been conventionally subjected to a large load due to press-fitting, resulting in distortion and degradation of optical performance, into the lens barrel 2 as the intermediate lens group 1a.

An aperture 4 is provided between the second lens 12 and a third lens 13. The aperture 4 is a member that controls the quantity of light entering the lens by opening a predetermined aperture. The aperture 4 includes an opening aperture and a flare aperture. The opening aperture controls the transmitted light quantity and determines the F value, which is an index of brightness. The flare aperture shields light rays that cause ghosting and aberration. In this non-limiting embodiment, the aperture 4 may be disposed between the interval ring 6, which is disposed between the second lens 12 and the third lens 13, and the object surface side of the third lens 13. This has the effect of maintaining the lens interval. As a material for the aperture 4, a metal may be used from the point such as durability. The metal includes, for example, stainless steel and aluminum, and when considering durability, stainless steel may be used.

The lens barrel 2 may have a reference position 9, the interval ring 6, and the like, in addition to the above mentioned.

The reference position 9 is a standard for the arrangement of the lens, when the intermediate lens group 1a is press-fitted into the lens barrel 2. The reference position 9 also refers to an abutment point of a lens surface where the lens is first placed. In this non-limiting embodiment, the amount of change in the lens group 1 and the amount of change in the lens barrel 2 with respect to the linear expansion of the lens barrel 2 may be reconciled. For this purpose, the reference position 9 may be provided at a substantially intermediate position in the entire lens group 1 (the position between the third lens 13 and the fourth lens 14). Providing the reference position 9 at the substantially intermediate position in the lens group 1 has the effect of making the lens unit 10 more compact than providing it at the aperture position or one side of the entire lens. The reference position 9 may be changed as needed depending on the number of lenses, their performance, and the like, and distortion is less likely to occur if the number of lenses in front and back where the reference position 9 is centered are the same.

As shown in FIG. 4, within the lens barrel 2, the third lens abutment reference surface 93 is inclined toward the image surface side. A fourth lens abutment reference surface 94 is inclined toward the object side. Since the third lens abutment reference surface 93 and the fourth lens abutment reference surface 94 are inclined respectively, the reference position 9 is formed by protruding into a roof shape. The third lens 13 is held in an appropriate position by coming contact with the third lens abutment reference surface 93. The fourth lens 14 is held in an appropriate position by coming contact with the fourth lens abutment reference surface 94. The reference position 9 forms at least one projection or stepped portion protruding in the circumferential direction of the lens barrel 2, and the inner circumferential surface is circular shape. The reason why the third lens abutment reference surface 93 and the fourth lens abutment reference surface 94 are each inclined is to reduce internal reflection, which affects imaging, or to make it easier to pull out a mold when it is integrally molded with the lens barrel 2.

An optical design is based on the reference position 9. The optical design can optically compensate lens focal length variation and the expansion and contraction of the lens barrel 2, which occurs when the environmental temperature changes from the low temperature side (−40° C.) to the high temperature side (+125° C.) with respect to the reference temperature of the lens unit 10 (approximately 20° C.). At this time, the reference position 9 is disposed at the substantially intermediate position in the entire lens group 1. Therefore, it is possible to design a compensation that takes into consideration a smaller amount of change than setting a reference at the object side or the edge of the image surface side. This makes it easier to design optics and obtain more stable optical performance. The optical design is described later. On the other hand, if the reference position 9 does not meet the above conditions, it will be difficult to perform an optical design that satisfies the temperature compensation within the temperature range used.

For instance, when installing the first lens 11 to the sixth lens 16 in the lens barrel 2, first, the third lens 13 from the object side of the barrel 2 and the fourth lens 14 from the image surface side are incorporated into the reference position 9. Next, the second lens 12 and the first lens 11 may be incorporated in the order of the second lens 12 and the first lens 11 from the object side of the barrel 2, and the fifth lens 15 and the sixth lens 16 may be incorporated in the order of the fifth lens 15 and the sixth lens 16 from the image surface side. At this time, the first lens group has negative refractive power, including the first lens 11 and the second lens 12. The second lens group has positive refractive power, including the third lens 13 to the sixth lens 16. The first lens group is then arranged with the second lens group via the opened aperture 4 interposed therebetween. Thus, if there is an imbalance in the length on the optical axis between the first lens group and the second lens group for the entire lens, providing the reference position 9 at the substantially intermediate position on the entire lens will optically compensate for the lens focal length variation and the expansion and contraction of the lens barrel 2, which occurs when the environmental temperature changes, resulting in stable optical performance.

The interval ring 6 is provided between the second lens 12 and the third lens 13 which are disposed at intervals, to maintain the interval between adjacent lenses. The interval ring 6 is also provided between the fourth lens 14 and the fifth lens 15 which are disposed at intervals. The interval ring 6 is a member disposed within the lens barrel 2. The outer circumferential surface of this interval ring 6 comes into contact with the inner circumferential surface of the lens barrel 2. The interval ring 6 may be formed of metal due to its small change in temperature and high rigidity. The interval ring 6 made of metal can ensure stable optical performance in a wide temperature range. The material of the interval ring 6 includes, for example, aluminum, titanium, and stainless steel. From the viewpoint of the reduction in weight and cost, aluminum may be used as a material for the interval ring 6.

The fifth lens 15 and the sixth lens 16 are joined together to form a cemented lens. The cemented lens may be protected by disposing the fifth lens 15, which has a smaller diameter than the sixth lens 16, on the object side, so that stresses in the optical axis direction due to temperature changes do not act on the cemented surface. Laminating the fifth lens 15 and the sixth lens 16 together improves the occurrence of chromatic aberration. In addition, even when the number of lenses is increased, it can be designed to minimize the effect of misalignment that occurs during lens installation and have lower built-in sensitivity. This cemented lens and the fourth lens 14 may be interval-specified by the interval ring 6.

Explanation of the Optical System

Figure 5:
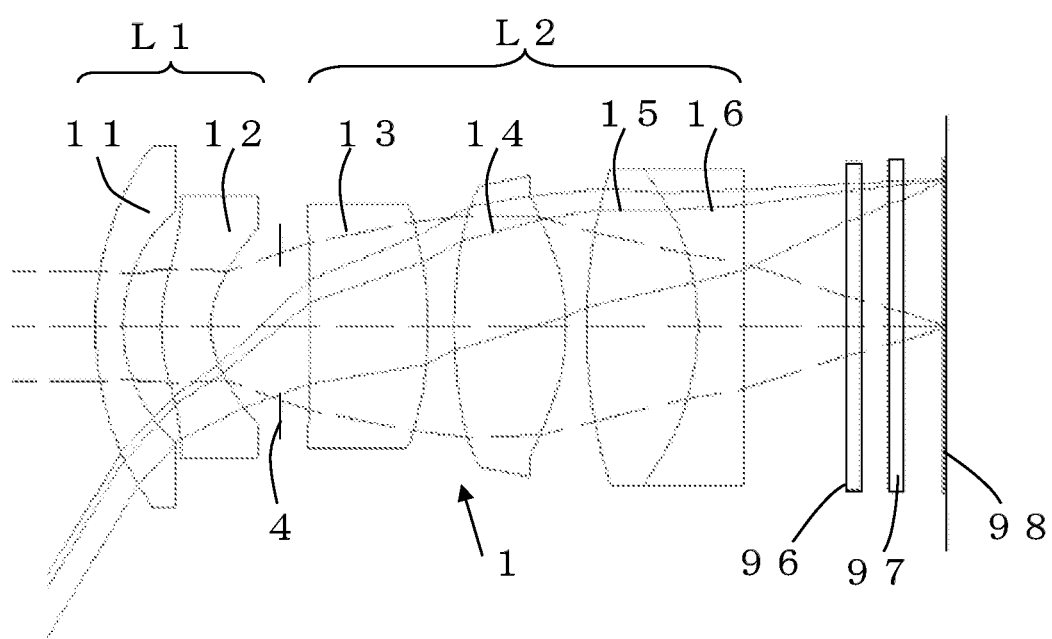
FIG. 5 is a schematic diagram showing lens placement in numerical examples.

The optical system of the present disclosure will be described below in accordance with FIGS. 1 and 5. The lens unit 10 is composed of 6 elements and 5 groups. The lens unit 10 is a retrofocus type, constructed of a first lens group (L1) having a negative power (refractive power) as a whole and a second lens group (L2) having a positive power as a whole, with the aperture 4 interposed therebetween. This configuration of the lens unit 10 is designed to allow for miniaturization while ensuring sufficient back focus.

The first lens group (L1) is composed of two meniscus concave lenses which are the first lens 11 and the second lens 12, in order from the object side. The second lens group (L2) is composed of convex lenses of the third lens 13, the fourth lens 14 and the fifth lens 15, and the sixth lens 16, which is a concave lens, from the object side. The fifth lens 15 and the sixth lens 16 are cemented lenses. The second lens group (L2) is composed of 4 elements and 3 groups. This cemented lens is a convex lens having positive power as a whole, composed of a pair of lenses that a convex fifth lens 15 and a concave sixth lens 16 joined together. Therefore, three group that is composed of the second lens group (L2) have a lens configuration with positive power distribution.

When using the imaging lens of the present disclosure as a lens unit for vehicle, it may be sufficient to ensure high imaging performance in a temperature range of −40° C. to +120° C., considering use in cold or tropical districts.

As the material of the lens barrel 2, a plastic, in this case PPS resin, which has excellent environmental stability may be selectively used. The optical system may be designed so that the image can be formed correctly even when the relative distance between the lens and the imaging sensor in the linear expansion of the resin lens barrel 2 changes.

One of the features of the present disclosure is the total length ratio of the first lens group to the second lens group.

When the distance from the aperture to the object side surface of the first lens group is indicated as (Df), and the distance from the aperture to the surface of the image surface side of the second lens group is indicated as (Dr), $$0.346 < Df/Dr < 0.509 \quad \text{Formula (1)}$$

may be satisfied.

If the total length ratio is below the lower limit of formula (1), the total length of the second lens group is too long compared to the first lens group. In this case, it may not be possible for the optical system to compensate for the linear expansion of the lens barrel 2 against temperature changes. Conversely, if it exceeds the upper limit, the lens interval in the second lens group cannot be optimized, or the interval between two lenses in the first lens group becomes large. In this case, it becomes difficult to design miniaturization.

First Lens Group

When the focal length of the entire imaging optical system is indicated as "f" and the focal length of the first lens group is indicated as "f1", as the imaging lens, $$1.070 < |f1/f| < 1.249 \quad \text{Formula (2)}$$

and $$0.995 < |f1/Df| < 1.176 \quad \text{Formula (3)}$$

may be satisfied.

In the present disclosure, the total length ratio of the first lens group is set small, as shown in formula (1) above. In order to obtain excellent imaging performance under these conditions, formulas (2) and (3) may be satisfied for the focal length of the first lens group. The parameters in formulas (2) and (3) are related to the focal length of the first lens group. By setting this range, excellent image quality can be achieved up to the periphery of the view field, as shown in the Examples below.

Second Lens Group

When the focal length of the entire imaging optical system is indicated as "f" and the focal length of the second lens group is indicated as "f2", as the imaging lens, $$0.967 < |f2/f| < 1.108 \quad \text{Formula (4)}$$

and $$0.361 < |f2/Dr| < 0.471 \quad \text{Formula (5)}$$

may be satisfied.

Similar to the first lens group described above, formulas (4) and (5) may also be satisfied for the focal length of the second lens group, in order to obtain excellent imaging performance. The parameters in formulas (4) and (5) are related to the focal length of the second group. By setting this range, excellent image quality can be achieved up to the periphery of the view field, as shown in the Examples below.

Each lens will be explained individually below.

First Lens

The first lens 11 is the lens located on the most object side, and it captures the light that enters first. Therefore, the quality of the design of this first lens 11 will affect the overall aberration correction. For a material of the first lens 11, a glass material with a small linear expansion coefficient is used, so as to facilitate the design of the operating environment temperature characteristics. The first lens 11 has a meniscus shape having a convex surface on the object side.

Second Lens

The second lens 12 has a meniscus shape with a convex surface on the object side, similar to the first lens. The second lens 12 is disposed close to the first lens 11. By disposing the second lens 12 close to the first lens 11, the aperture of the first lens 11 is not enlarged for obtaining the desired angle of incidence view.

For a glass material of the second lens 12, the selection of high-dispersion glass materials and the use of aspherical surfaces on both sides contribute to imaging performance that ensures a high MTF.

Third Lens

For a material of the first third lens 13 of the second lens group, which is first disposed from the aperture 4, it may be possible to use a glass material with high refractive index and high dispersion like the second lens. In addition, it is possible to ensure a higher MTF by approximating the dispersion characteristics of the adjacent lenses of the first lens group (L1) and the second lens group (L2) with the aperture interposed therebetween.

For example, in each Example described below, it is selected for the glass material that a value (vd) indicating the dispersion characteristics of the second lens 12 at the d-line (wavelength 589.29 nm) is 31.1, and a value indicating the dispersion characteristics of the third lens 13 is 37.4. An appropriate optical system can be achieved by selecting the glass material whose value for the dispersion characteristics of both lenses is less than 40.

Fourth Lens

The fourth lens 14 is the most powerful biconvex lens, and a glass material with a negative refractive index temperature coefficient (dn/dt) and a large linear expansion coefficient may be selectively used. This allows the optical characteristics of the lens itself to change in response to the temperature change of the lens barrel 2. Then, the entire optical system can be designed to image correctly on the surface of the imaging sensor.

A low-dispersion glass material is used for the fourth lens 14 so as not to adversely affect chromatic aberration, even when the optical characteristics change in response to the temperature change. In the Examples described below, the glass material that the refractive index temperature coefficient (D-line) at 20° C. to 40° C. is −6.6×10⁻⁶/° C. (dn/dt) is used for the fourth lens 14. The linear expansion coefficient α (20/120 degrees (10⁻⁷/° C.)) of the glass material is 141. By choosing this type of glass material for the fourth lens 14, it is possible to achieve an optical design that allows for temperature compensation and maintain high imaging performance over a wide environmental temperature range of −40° C. to 120° C. The fourth lens 14 is the biconvex lens that obtains the greatest amount of power for this optical system, and the imaging performance of the optical system itself can be improved by making the object side and the image surface side aspherical.

<Fifth Lens and Sixth Lens>

The fifth lens 15 and the sixth lens 16 are laminated (joined) together. This allows the fifth lens 15 and the sixth 16 to be designed to improve the occurrence of chromatic aberration and minimize the effect of misalignment that occurs during lens installation and have lower built-in sensitivity, even when the number of lenses is increased.

The aspherical surfaces employed in the wide-angle lenses (the first lens 11 to the sixth lens 16) of the present non-limiting embodiment are all represented by the following aspherical formula. In the formula, "h" stands for the height in the direction perpendicular to the optical axis, "Z" stands for the amount of displacement in the optical axis direction at height "h" (sag amount), "r" stands for the curvature radius of the reference spherical surface (paraxial curvature radius), and "k" stands for the conical coefficient. "A", "B", "C", and "D" respectively represent the 4th, 6th, 8th, and 10th order aspherical surface coefficients. These values are shown in Tables for each numerical example. In a table showing the aspherical surface coefficient, "E-04" means "×10⁻⁴".

$$z = \frac{\frac{h^2}{r}}{1 + \sqrt{1 - \frac{(1+k)h^2}{r^2}}} + Ah^4 + Bh^6 + Ch^8 + \ldots$$

[Mathematical Expression 1]

Numerical Example

As numerical examples, five Examples with the following optical system quantities are prepared and evaluated. The lens configuration is composed of 6 elements and 5 groups, as schematically shown in FIG. 5. The same reference numerals are placed on the same parts as the above described parts, and the explanation is omitted.

At this time, a cover glass (CG) 97 and an IR (infrared) cut filter (IRCF) 96 are installed in front of the image surface (imaging sensor surface) 98. The solid line through each lens shows the peripheral luminous flux and the dashed line shows the central luminous flux. Each value for the lens group 1 is shown below.

Focal length f=5.325 mm
FNo.=1.6
Horizontal angle of view=112 degrees

As a numerical example 1, an optical system of 6 elements and 5 groups with the following lens data is designed. The surface numbers in Table 1 are the numbers of each lens surface that constitute the optical system and are sequential numbers from the object side. The curvature "R" indicates the curvature radius of each lens surface. The interval is the distance between the surfaces on the optical axis. The term "aspherical surface" in the table refers to aspherical surface lenses, while the others are spherical surface lenses.

Figure 6:
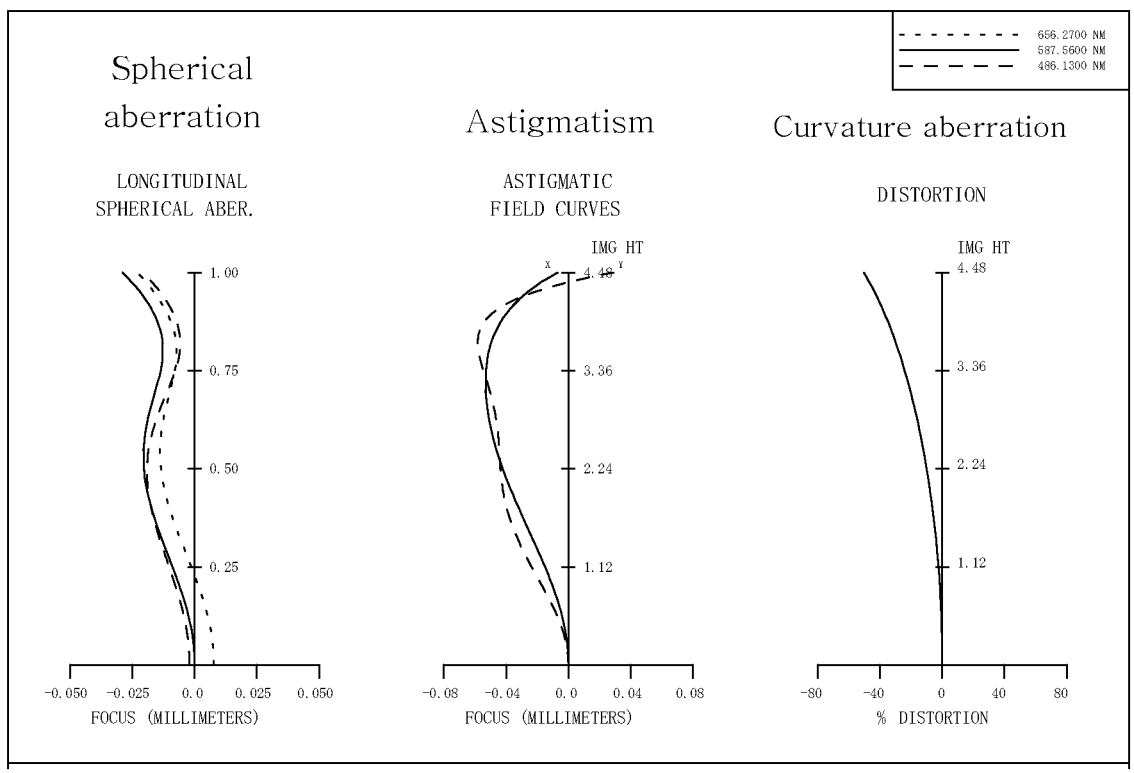
FIG. 6 is a lens aberration diagram of numerical example 1.
Figure 7:
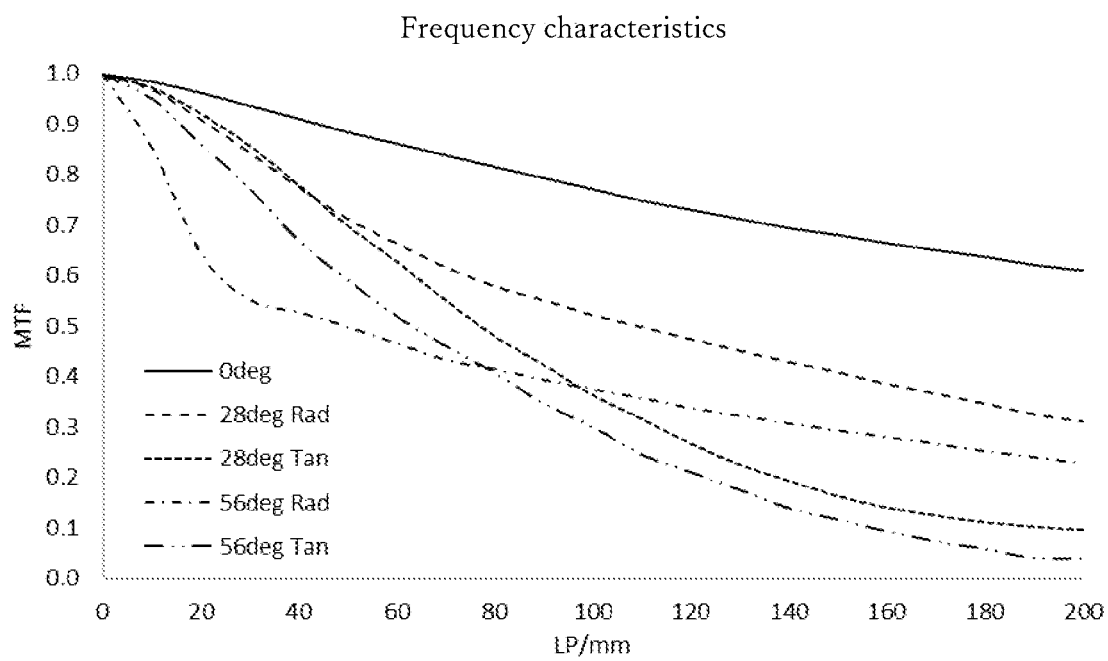
FIG. 7 is an MTF (Modulation Transfer Function) characteristic diagram of numerical example 1.

The "nd" in the table is the refractive index at the d-line (wavelength 589.29 nm). The "vd" is also a value for the dispersion characteristics at the d-line (wavelength 589.29 nm). Table 2 shows the numerical examples 1 of the aspherical surface numbers 5, 6, 10, and 11. The aberration characteristic diagram of this Example 1 is shown in FIG. 6, and the MTF characteristic diagram is shown in FIG. 7.

TABLE 1

| Surface Number | | Curvature R | Interval | Refractive Index (nd) | Dispersion (vd) |
|---|---|---|---|---|---|
| 3 | | 9.2674 | 0.9000 | 1.54678 | 62.7 |
| 4 | | 4.2289 | 1.2329 | | |
| 5 | Aspherical Surface | 4.7046 | 1.5863 | 1.68894 | 31.1 |
| 6 | Aspherical Surface | 2.6878 | 1.9942 | | |
| 7 | Aperture | ∞ | 0.2279 | | |
| 8 | | −21.6901 | 3.1000 | 1.90043 | 37.4 |
| 9 | | −9.0817 | 0.9000 | | |
| 10 | Aspherical Surface | 17.9596 | 3.6000 | 1.49700 | 81.6 |
| 11 | Aspherical Surface | −6.2480 | 0.5568 | | |
| 12 | | 19.3175 | 3.6000 | 1.72916 | 54.7 |
| 13 | | −7.0500 | 1.0500 | 1.92286 | 20.9 |
| 14 | | −43.2278 | 2.3518 | | |
| 15 | | ∞ | 0.5000 | | |
| 16 | | ∞ | 0.1000 | | |
| 17 | | ∞ | 1.5000 | | |
| 18 | IRCF | ∞ | 0.5000 | 1.51633 | 64.1 |
| 19 | | ∞ | 1.1900 | | |
| 20 | CG | ∞ | 0.0100 | 1.51633 | 64.1 |
| 21 | | ∞ | 0.1131 | | |

TABLE 2

| | S5 | S6 | S10 | S11 |
|---|---|---|---|---|
| r | 4.70461E+00 | 2.68777E+00 | 1.79596E+01 | −6.24798E+00 |
| k | −3.39363E+00 | −1.89796E+00 | 8.78846E+00 | −4.40345E−01 |
| A | 1.60298E−04 | 3.97211E−03 | −5.51050E−05 | 1.62900E−05 |
| B | −3.94858E−04 | −9.62228E−04 | −8.28628E−06 | 3.15471E−05 |
| C | 1.14764E−05 | 7.02225E−05 | 1.01066E−06 | −2.11760E−06 |
| D | 1.56900E−07 | 0.00000E+00 | 3.96148E−09 | 1.00786E−07 |

Figure 8:
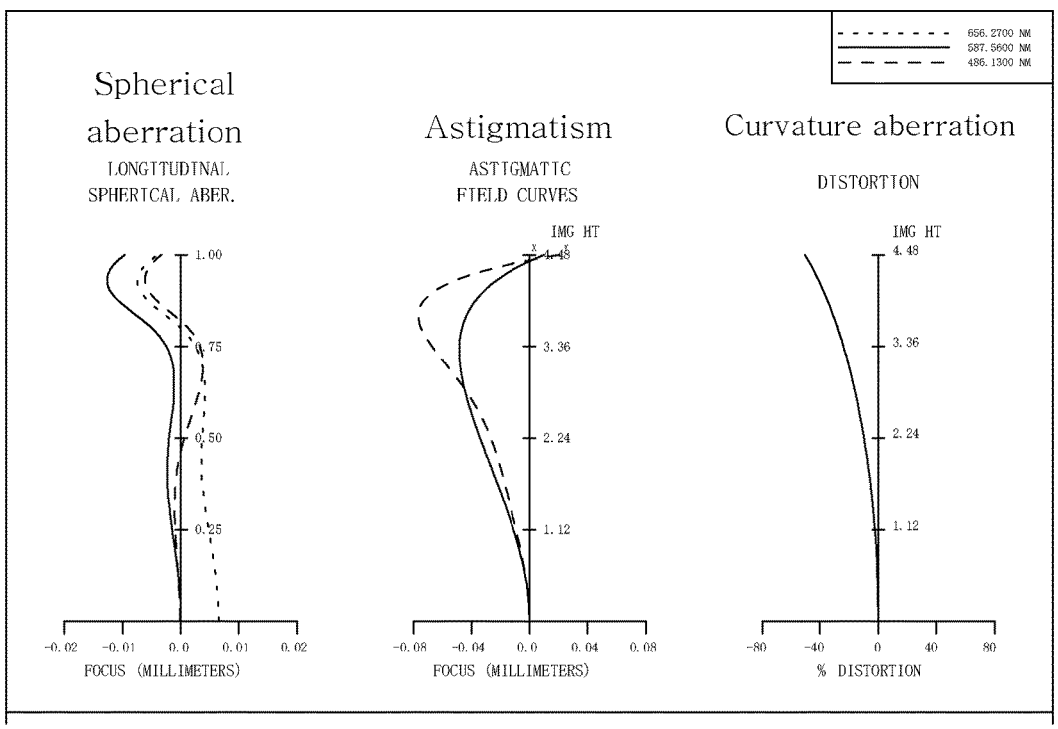
FIG. 8 is a lens aberration diagram of numerical example 2.
Figure 9:
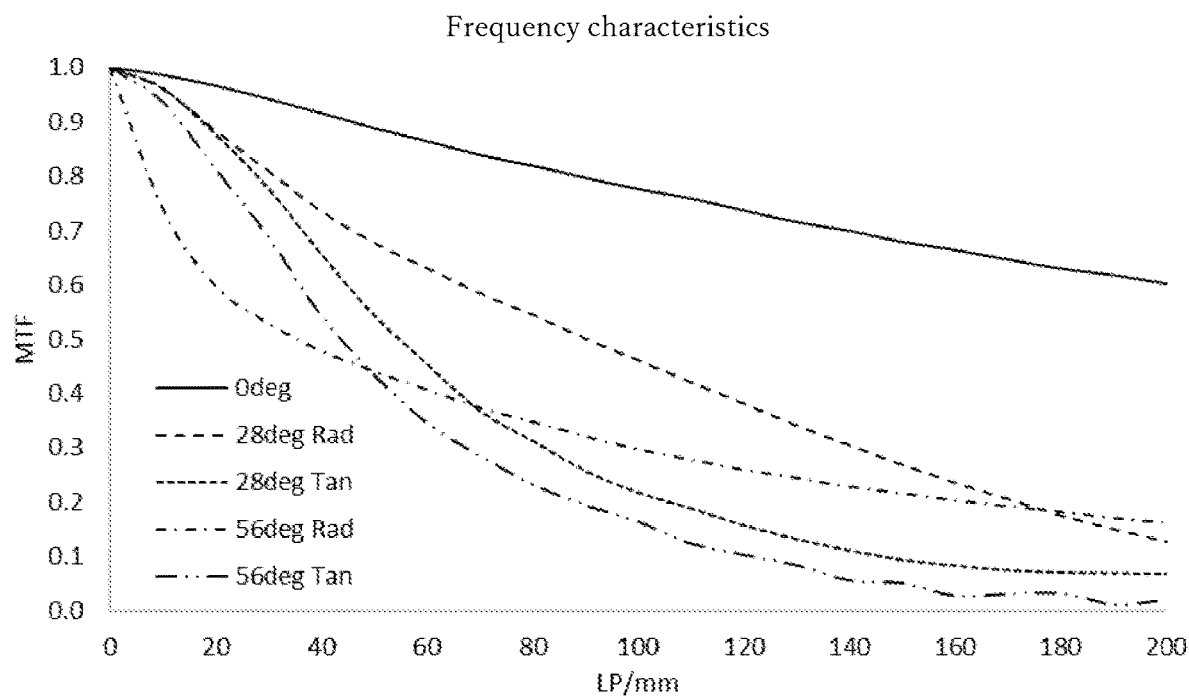
FIG. 9 is an MTF characteristic diagram of numerical example 2.

As a numerical example 2, an optical system of 6 elements and 5 groups with the following lens data is designed. The aberration characteristic diagram of this Example 2 is shown in FIG. 8, and the MTF characteristic diagram is shown in FIG. 9.

TABLE 3

| Surface Number | | Curvature R | Interval | Refractive Index (nd) | Dispersion (vd) |
|---|---|---|---|---|---|
| 3 | | 9.2852 | 0.900 | 1.54678 | 62.7 |
| 4 | | 4.1748 | 1.330 | | |
| 5 | Aspherical Surface | 5.5060 | 2.061 | 1.68894 | 31.1 |
| 6 | Aspherical Surface | 2.8223 | 1.437 | | |
| 7 | Aperture | ∞ | 0.173 | | |
| 8 | | −37.0000 | 3.271 | 1.90043 | 37.4 |
| 9 | | −8.9405 | 0.585 | | |
| 10 | Aspherical Surface | 31.6981 | 3.399 | 1.49700 | 81.6 |
| 11 | Aspherical Surface | −5.7759 | 0.933 | | |
| 12 | | 14.9822 | 3.600 | 1.72916 | 54.7 |
| 13 | | −7.0500 | 2.113 | 1.92286 | 20.9 |
| 14 | | −54.2127 | 1.298 | | |
| 15 | | ∞ | 0.500 | | |
| 16 | | ∞ | 0.100 | | |
| 17 | | ∞ | 1.500 | | |
| 18 | IRCF | ∞ | 0.500 | 1.51633 | 64.1 |
| 19 | | ∞ | 1.190 | | |
| 20 | CG | ∞ | 0.010 | 1.51633 | 64.1 |
| 21 | | ∞ | 0.102 | | |

TABLE 4

| | S5 | S6 | S10 | S11 |
|---|---|---|---|---|
| r | 5.50599E+00 | 2.82234E+00 | 3.16981E+01 | −5.77589E+00 |
| k | −5.06178E+00 | −1.98982E+00 | 9.99738E+00 | −2.15200E−01 |
| A | 7.63393E−04 | 4.79352E−03 | 1.75120E−04 | 3.42151E−05 |
| B | −3.07064E−04 | −8.57566E−04 | 8.91516E−07 | 3.03516E−05 |
| C | 2.71502E−06 | 6.51043E−05 | 6.61691E−07 | −2.33880E−06 |
| D | 3.66660E−07 | 0.00000E+00 | 5.77303E−08 | 1.52067E−07 |

Figure 10:
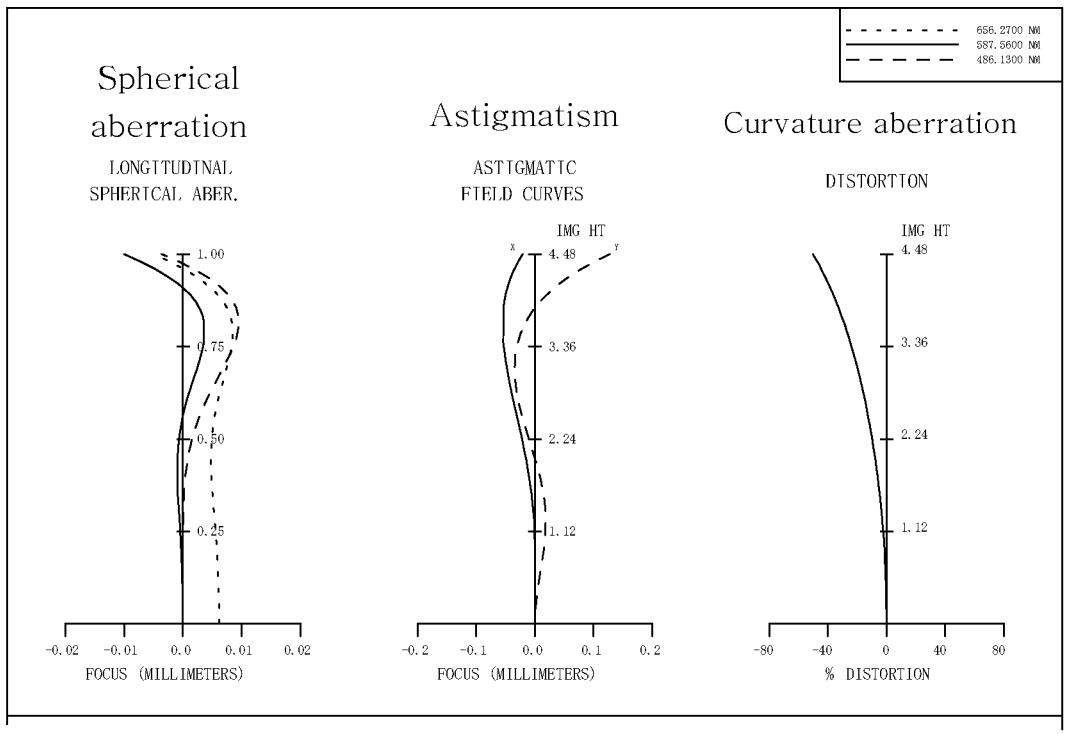
FIG. 10 is a lens aberration diagram of numerical example 3.
Figure 11:
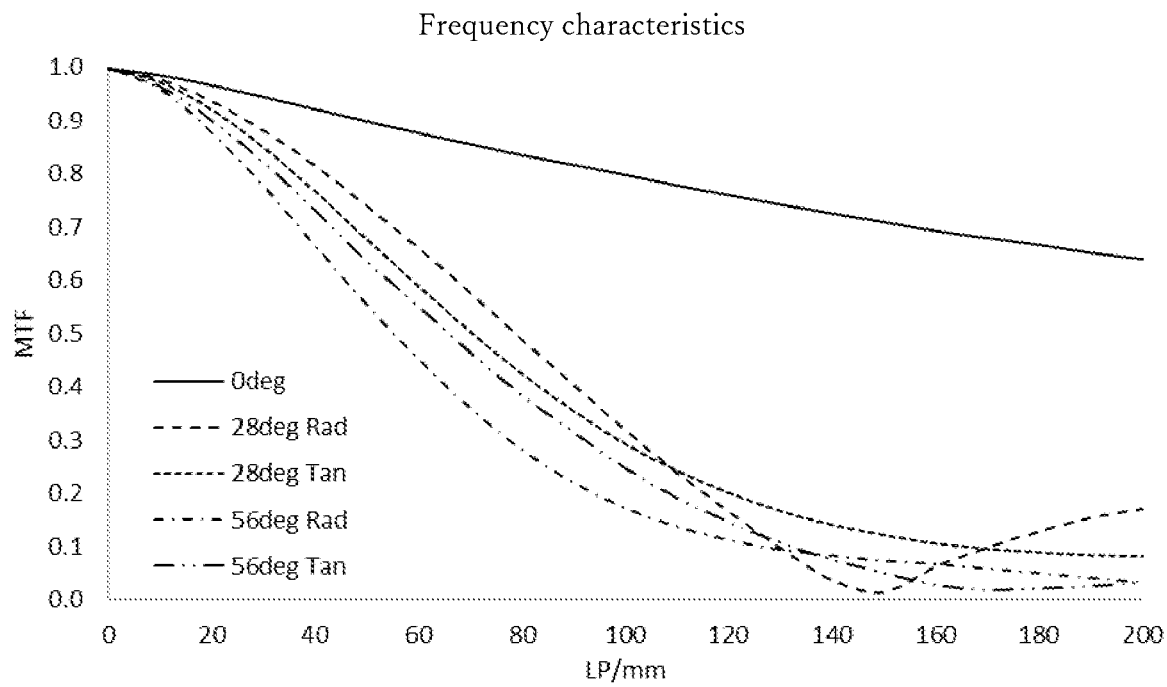
FIG. 11 is an MTF characteristic diagram of numerical example 3.

As a numerical example 3, an optical system of 6 elements and 5 groups with the following lens data is designed. The aberration characteristic diagram of this Example 3 is shown in FIG. 10, and the MTF characteristic diagram is shown in FIG. 11.

TABLE 5

| Surface Number | | Curvature R | Interval | Refractive Index (nd) | Dispersion (vd) |
|---|---|---|---|---|---|
| 3 | | 8.8587 | 0.900 | 1.54678 | 62.7 |
| 4 | | 4.2369 | 1.181 | | |
| 5 | Aspherical Surface | 4.5565 | 1.500 | 1.68894 | 31.1 |
| 6 | Aspherical Surface | 2.7562 | 2.074 | | |
| 7 | Aperture | ∞ | 0.188 | | |
| 8 | | −31.1425 | 3.400 | 1.90043 | 37.4 |
| 9 | | −9.1412 | 1.256 | | |
| 10 | Aspherical Surface | 21.2514 | 3.398 | 1.49700 | 81.6 |
| 11 | Aspherical Surface | −6.3271 | 0.225 | | |
| 12 | | 15.1869 | 3.600 | 1.72916 | 54.7 |
| 13 | | −7.6826 | 2.377 | 1.92286 | 20.9 |
| 14 | | 3711.6311 | 1.001 | | |
| 15 | | ∞ | 0.500 | | |
| 16 | | ∞ | 0.100 | | |
| 17 | | ∞ | 1.500 | | |
| 18 | IRCF | ∞ | 0.500 | 1.51633 | 64.1 |
| 19 | | ∞ | 1.190 | | |
| 20 | CG | ∞ | 0.010 | 1.51633 | 64.1 |
| 21 | | ∞ | 0.097 | | |

TABLE 6

| | S5 | S6 | S10 | S11 |
|---|---|---|---|---|
| r | 4.55648E+00 | 2.75623E+00 | 2.12514E+01 | −6.32714E+00 |
| k | −6.23762E+00 | −2.28151E+00 | −8.25840E+00 | −3.06605E−01 |
| A | 4.03402E−03 | 5.79515E−03 | 3.17955E−04 | 2.33950E−04 |
| B | −8.34362E−04 | −1.12841E−03 | −3.10475E−05 | −3.68990E−07 |
| C | 4.17033E−05 | 7.14962E−05 | 2.44854E−06 | 1.39190E−07 |
| D | −7.54686E−07 | 0.00000E+00 | −5.53093E−08 | 1.45850E−08 |

Figure 12:
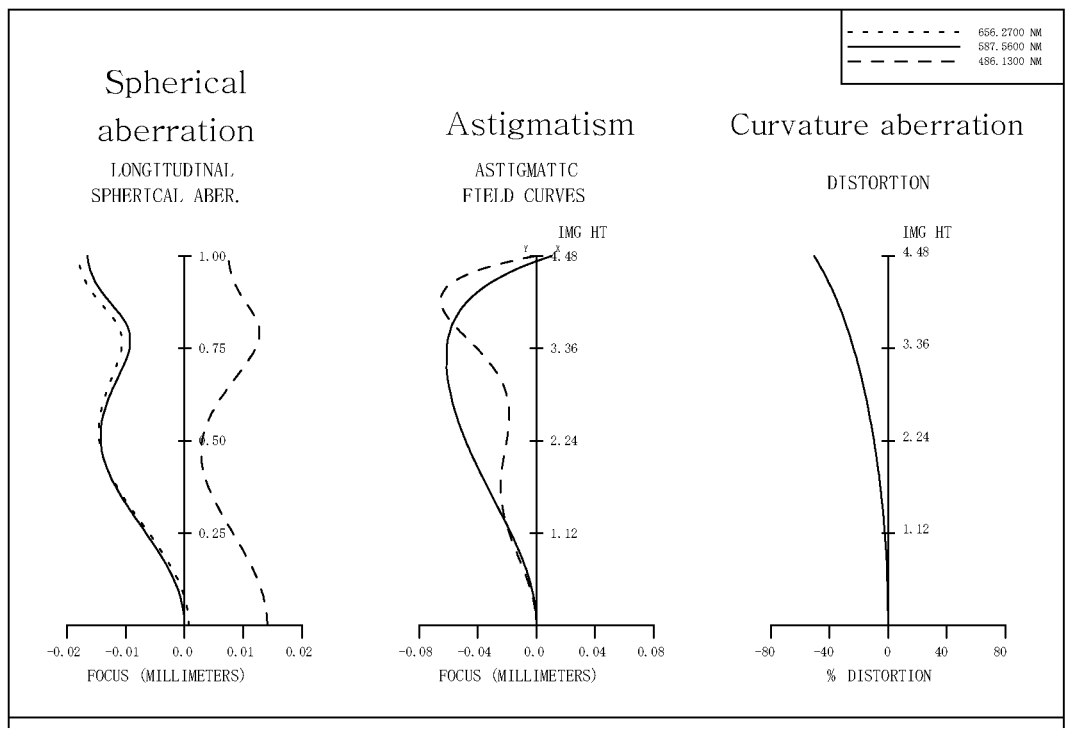
FIG. 12 is a lens aberration diagram of numerical example 4.
Figure 13:
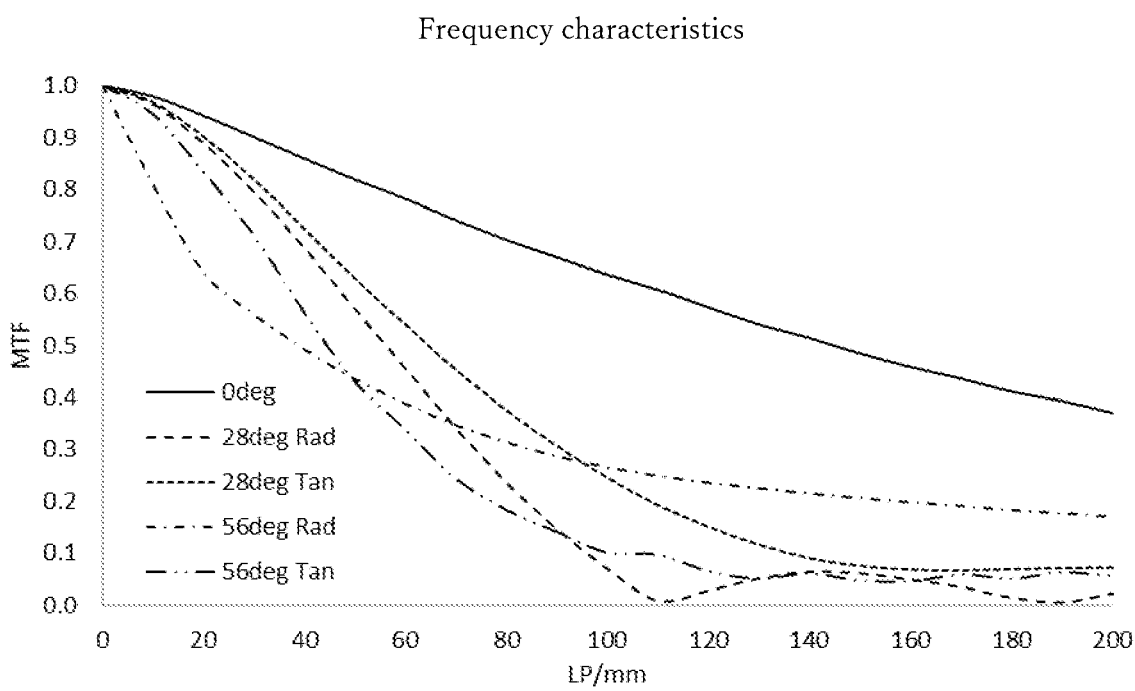
FIG. 13 is an MTF characteristic diagram of numerical example 4.

As a numerical example 4, an optical system of 6 elements and 5 groups with the following lens data is designed. The aberration characteristic diagram of this Example 4 is shown in FIG. 12, and the MTF characteristic diagram is shown in FIG. 13.

TABLE 7

| Surface Number | | Curvature R | Interval | Refractive Index (nd) | Dispersion (vd) |
|---|---|---|---|---|---|
| 3 | | 8.9986 | 0.900 | 1.54678 | 62.7 |
| 4 | | 4.1287 | 1.412 | | |
| 5 | Aspherical Surface | 6.6879 | 2.375 | 1.68894 | 31.1 |
| 6 | Aspherical Surface | 3.2746 | 1.127 | | |
| 7 | Aperture | ∞ | 0.175 | | |
| 8 | | −32.7349 | 3.400 | 1.90043 | 37.4 |
| 9 | | −8.8651 | 0.535 | | |
| 10 | Aspherical Surface | 28.1533 | 3.400 | 1.49700 | 81.6 |
| 11 | Aspherical Surface | −5.7268 | 0.537 | | |
| 12 | | 14.2208 | 3.400 | 1.72916 | 54.7 |
| 13 | | −7.5952 | 2.839 | 1.92286 | 20.9 |
| 14 | | −98.7008 | 1.000 | | |
| 15 | | ∞ | 0.500 | | |
| 16 | | ∞ | 0.100 | | |
| 17 | | ∞ | 1.500 | | |
| 18 | IRCF | ∞ | 0.500 | 1.51633 | 64.1 |
| 19 | | ∞ | 1.190 | | |

TABLE 7-continued

| Surface Number | | Curvature R | Interval | Refractive Index (nd) | Dispersion (vd) |
|---|---|---|---|---|---|
| 20 | CG | ∞ | 0.010 | 1.51633 | 64.1 |
| 21 | | ∞ | 0.109 | | |

TABLE 8

| | S5 | S6 | S10 | S11 |
|---|---|---|---|---|
| r | 6.68786E+00 | 3.27457E+00 | 2.81533E+01 | −5.72683E+00 |
| k | −5.62154E+00 | −2.20469E+00 | 5.63421E+00 | −3.69654E−01 |
| A | 8.17277E−05 | 4.26833E−03 | 2.22300E−04 | −1.40021E−04 |
| B | −1.60002E−04 | −5.51000E−04 | −1.54123E−06 | 4.51015E−05 |
| C | −3.67865E−06 | 4.04290E−05 | 8.62888E−07 | −4.13719E−06 |
| D | 3.82121E−07 | 0.00000E+00 | 6.09935E−08 | 2.17521E−07 |

Figure 14:
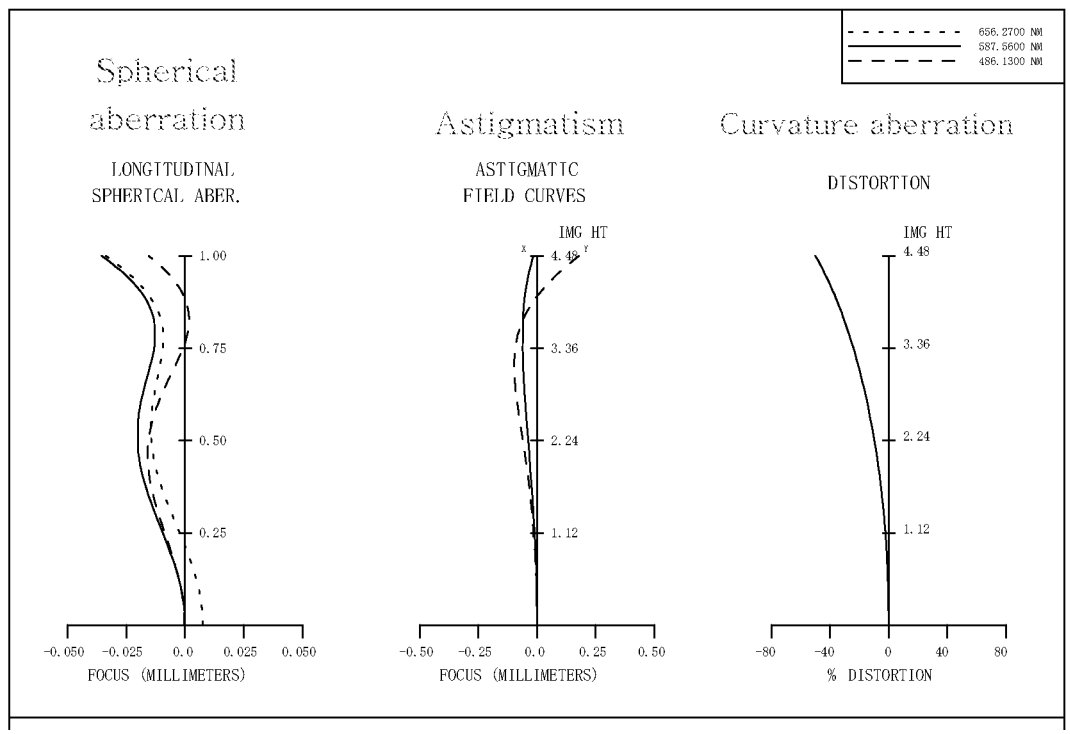
FIG. 14 is a lens aberration diagram of numerical example 5.
Figure 15:
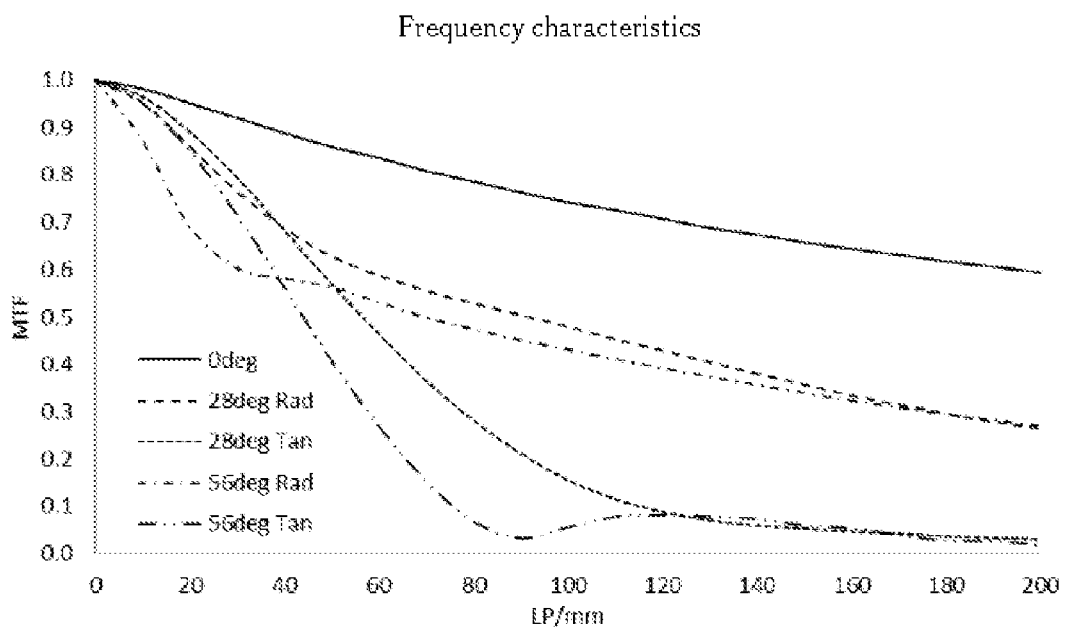
FIG. 15 is an MTF characteristic diagram of numerical example 5.

As a numerical example 5, an optical system of 6 elements and 5 groups with the following lens data is designed. The aberration characteristic diagram of this Example 5 is shown in FIG. 14, and the MTF characteristic diagram is shown in FIG. 15.

TABLE 9

| Surface Number | | Curvature R | Interval | Refractive Index (nd) | Dispersion (vd) |
|---|---|---|---|---|---|
| 3 | | 9.7902 | 0.900 | 1.54678 | 62.7 |
| 4 | | 4.4792 | 1.112 | | |
| 5 | Aspherical Surface | 4.4000 | 1.500 | 1.68894 | 31.1 |
| 6 | Aspherical Surface | 2.5012 | 2.180 | | |
| 7 | Aperture | ∞ | 0.118 | | |
| 8 | | −28.3868 | 3.330 | 1.90043 | 37.4 |
| 9 | | −9.2402 | 1.637 | | |
| 10 | Aspherical Surface | 20.2083 | 3.223 | 1.49700 | 81.6 |
| 11 | Aspherical Surface | −6.3959 | 0.626 | | |
| 12 | | 25.4909 | 2.730 | 1.72916 | 54.7 |
| 13 | | −7.0501 | 0.850 | 1.92286 | 20.9 |
| 14 | | −29.6186 | 3.130 | | |
| 15 | | ∞ | 0.500 | | |
| 16 | | ∞ | 0.100 | | |
| 17 | | ∞ | 1.500 | | |
| 18 | IRCF | ∞ | 0.500 | 1.51633 | 64.1 |
| 19 | | ∞ | 1.190 | | |
| 20 | CG | ∞ | 0.010 | 1.51633 | 64.1 |
| 21 | | ∞ | 0.111 | | |

TABLE 10

| | S5 | S6 | S10 | S11 |
|---|---|---|---|---|
| r | 4.40000E+00 | 2.50119E+00 | 2.02083E+01 | −6.39593E+00 |
| k | −3.41829E+00 | −1.95618E+00 | 5.75783E+00 | −1.76064E+00 |
| A | 4.72571E−04 | 4.49870E−03 | 9.25806E−05 | −4.14948E−04 |
| B | −5.68789E−04 | −1.17828E−03 | −3.96388E−05 | −1.05893E−05 |
| C | 3.00860E−05 | 8.47860E−05 | 3.29092E−06 | 9.19851E−07 |
| D | −4.33855E−07 | 0.00000E+00 | −6.84223E−08 | −6.29351E−11 |

Table 11 below summarizes the parameter conditional formulas (1) to (6) shown in the text for the numerical examples 1 to 5 described above.

TABLE 11

| | f | f1 | f2 | Df | Dr | Conditional Formula 1 Df/Dr | Conditional Formula 2 \|f1/f\| | Conditional Formula 3 \|f1/Df\| | Conditional Formula 4 \|f2/f\| | Conditional Formula 5 \|f2/Dr\| | f4 | D4r | Conditional Formula 6 f4/D4r |
|---|---|---|---|---|---|---|---|---|---|---|---|---|---|
| Example 1 | 5.325 | −6.206 | 5.615 | 5.713 | 13.035 | 0.438 | 1.165 | 1.086 | 1.054 | 0.431 | 9.767 | 11.472 | 0.851 |
| Example 2 | 5.325 | −5.700 | 5.309 | 5.783 | 14.074 | 0.411 | 1.070 | 0.986 | 0.997 | 0.377 | 10.089 | 11.847 | 0.852 |
| Example 3 | 5.325 | −6.876 | 5.504 | 5.656 | 14.444 | 0.392 | 1.291 | 1.216 | 1.034 | 0.381 | 10.182 | 11.099 | 0.917 |
| Example 4 | 5.325 | −5.892 | 5.150 | 5.815 | 14.286 | 0.407 | 1.106 | 1.013 | 0.967 | 0.361 | 9.860 | 11.684 | 0.844 |
| Example 5 | 5.325 | −6.161 | 5.700 | 5.692 | 12.514 | 0.455 | 1.157 | 1.082 | 1.070 | 0.455 | 10.139 | 11.247 | 0.901 |

As shown in Table 11, it can be seen from the aberration and MTF characteristic diagrams shown in FIGS. 6 through 15 that the imaging lenses of the present disclosure have excellent optical performance in wide-angle lenses with an angle of view exceeding 100 degrees.

According to the present disclosure, the first lens group disposed on the object side with respect to the aperture is composed of two meniscus lenses (the first lens and the second lens from the object side) which forms a convex surface on the object side. This makes it possible to shorten the overall length of the first lens group, resulting in a compact, high-precision optical system. In addition, the fourth lens of the second lens group, which includes four lenses of the third to sixth lenses from the object side, provides a biconvex lens with greater power. This enables an optical design that is easily adapted to temperature compensation.

When the distance from the aperture to the object side surface of the first lens is indicated as Df, and the distance from the aperture to the image side surface of the sixth lens is indicated as Dr, $$0.346 < Df/Dr < 0.509 \quad \text{Formula (1)}$$

may be satisfied.

This parameter indicates the total length ratio between the first lens group and the second lens group of the lens unit. By setting this range, excellent image quality can be achieved up to the periphery of the view field.

When the focal length of the entire imaging optical system is indicated as "f", and the focal length of the first lens group is indicated as "f1", as the imaging lens, $$1.070 < |f1/f| < 1.249 \quad \text{Formula (2)}$$

and $$0.995 < |f1/Df| < 1.176 \quad \text{Formula (3)}$$

may be satisfied.

This parameter is related to the focal length of the first lens group. By setting this range, excellent image quality can be achieved up to the periphery of the view field.

When the focal length of the entire imaging optical system is indicated as "f" and the focal length of the second lens group is indicated as "f2", as the imaging lens, $$0.967 < |f2/f| < 1.108 \quad \text{Formula (4)}$$

and $$0.361 < |f2/Dr| < 0.471 \quad \text{Formula (5)}$$

may be satisfied.

This parameter is related to the focal length of the second lens group. By setting this range, excellent image quality can be achieved up to the periphery of the view field.

When the focal length of the fourth lens is indicated as "f4", and the distance on the optical axis from the lens surface of the image surface side of the fourth lens to the image surface is indicated as D4s, an imaging lens satisfies $$0.750 < f4/D4s < 0.909 \quad \text{Formula (6)}.$$

This parameter is related to the focal length of the fourth lens. By setting this range, excellent imaging performance can be achieved over a wide temperature range.

According to such an imaging lens, it is possible to provide an imaging lens suitable for camera devices such as vehicle cameras with low cost and excellent mass production capabilities. In particular, imaging lenses that may be used for sensing purpose can be provided.

Although non-limiting embodiments of the present disclosure have been described above, the present disclosure is not limited to the above-described non-limiting embodiments, and various improvements and changes may be made within the scope of the claims.

DESCRIPTION OF THE REFERENCE NUMERALS

1: Lens Group
1a: Intermediate Lens Group
1b: Both End Lens Groups
2: Lens Barrel
2a: Thick Wall Part
2b: Thin Wall Part
3: Retainer
4: Aperture
5: Projection
6: Interval Ring
8: Concave Portion
9: Reference Position
10: Lens Unit
100: Camera

What is claimed is:

1. An imaging lens with six elements and five groups which is a retrofocus type imaging optical system comprising:
in order from an object side, a first lens group having a negative refractive power, an aperture, and a second lens group having a positive refractive power,
wherein
the first lens group comprises, from the object side, a meniscus lens as a first lens having a negative refractive power in which a convex surface is formed on the object side, and a meniscus lens as a second lens having a negative refractive power in which a convex surface on the object side is formed;
the second lens group comprises, from the object side, a convex lens as a third lens having a positive refractive power, a biconvex lens as a fourth lens having a positive refractive power, a biconvex lens as a fifth lens having a positive refractive power, and a sixth lens having a negative refractive power; and the fifth lens and sixth lens are joined to each other; and
when a focal length of the entire imaging optical system is indicated as f and a focal length of the first lens group is indicated as f1, the imaging lens satisfies the following formulas: $1.070 < |f1/f| < 1.249$ and $0.995 < |f1/Df| < 1.176$.

2. The imaging lens according to claim 1, wherein, when the distance from the aperture to the object side surface of the first lens is indicated as Df, and the distance from the aperture to the image side surface of the sixth lens is indicated as Dr, the imaging lens satisfies the following formula: $0.346 < Df/Dr < 0.509$.

3. The imaging lens according to claim 1, wherein, when a focal length of the entire imaging optical system is indicated as f and a focal length of the second lens group is indicated as f2, the imaging lens satisfies the following formulas: $0.967 < |f2/f| < 1.108$ and $$0.361 < |f2/Dr| < 0.471.$$

4. The imaging lens according to claim 1, wherein, when a focal length of the fourth lens is indicated as f4 and the distance on an optical axis from an image side surface of the fourth lens to an image surface is indicated as D4s, the imaging lens satisfies the following formula:

$$0.750 < f4/D4s < 0.909.$$

5. The imaging lens according to claim 1, wherein a reference position serving as a reference of a lens placement is disposed between the third lens and the fourth lens of the second lens group.

6. A camera device, comprising:
the imaging lens according to claim 1.

7. The imaging lens according to claim 3, wherein, when a focal length of the fourth lens is indicated as f4 and the distance on an optical axis from an image side surface of the fourth lens to an image surface is indicated as D4s, the imaging lens satisfies the following formula:

$$0.750 < f4/D4s < 0.909.$$

8. An imaging lens with six elements and five groups which is a retrofocus type imaging optical system comprising:
in order from an object side, a first lens group having a negative refractive power, an aperture, and a second lens group having a positive refractive power,
wherein
the first lens group comprises, from the object side, a meniscus lens as a first lens having a negative refractive power in which a convex surface is formed on the object side, and a meniscus lens as a second lens having a negative refractive power in which a convex surface on the object side is formed;
the second lens group comprises, from the object side, a convex lens as a third lens having a positive refractive power, a biconvex lens as a fourth lens having a positive refractive power, a biconvex lens as a fifth lens having a positive refractive power, and a sixth lens having a negative refractive power; and the fifth lens and sixth lens are joined to each other; and
when a focal length of the entire imaging optical system is indicated as f and a focal length of the second lens group is indicated as f2, the imaging lens satisfies the following formulas: $0.967 < |f2/f| < 1.108$ and $$0.361 < |f2/Dr| < 0.471.$$

9. The imaging lens according to claim 8, wherein, when the distance from the aperture to the object side surface of the first lens is indicated as Df, and the distance from the aperture to the image side surface of the sixth lens is indicated as Dr, the imaging lens satisfies the following formula: $0.346 < Df/Dr < 0.509$.

10. The imaging lens according to claim 8, wherein, when a focal length of the fourth lens is indicated as f4 and the distance on an optical axis from an image side surface of the fourth lens to an image surface is indicated as D4s, the imaging lens satisfies the following formula:

$$0.750 < f4/D4s < 0.909.$$

11. The imaging lens according to claim 8, wherein a reference position serving as a reference of a lens placement is disposed between the third lens and the fourth lens of the second lens group.

12. A camera device, comprising:
the imaging lens according to claim 8.

13. An imaging lens with six elements and five groups which is a retrofocus type imaging optical system comprising:
in order from an object side, a first lens group having a negative refractive power, an aperture, and a second lens group having a positive refractive power,
wherein
the first lens group comprises, from the object side, a meniscus lens as a first lens having a negative refractive power in which a convex surface is formed on the object side, and a meniscus lens as a second lens having a negative refractive power in which a convex surface on the object side is formed;
the second lens group comprises, from the object side, a convex lens as a third lens having a positive refractive power, a biconvex lens as a fourth lens having a positive refractive power, a biconvex lens as a fifth lens having a positive refractive power, and a sixth lens having a negative refractive power; and the fifth lens and sixth lens are joined to each other; and
when a focal length of the fourth lens is indicated as f4 and the distance on an optical axis from an image side surface of the fourth lens to an image surface is indicated as D4s, the imaging lens satisfies the following formula:

$$0.750 < f4/D4s < 0.909.$$

14. The imaging lens according to claim 13, wherein, when the distance from the aperture to the object side surface of the first lens is indicated as Df, and the distance from the aperture to the image side surface of the sixth lens is indicated as Dr, the imaging lens satisfies the following formula: $0.346 < Df/Dr < 0.509$.

15. The imaging lens according to claim 13, wherein a reference position serving as a reference of a lens placement is disposed between the third lens and the fourth lens of the second lens group.

16. A camera device, comprising:
the imaging lens according to claim 13.

* * * * *